Oct. 19, 1965 J. L. BLANKENSHIP 3,212,940

METHOD FOR PRODUCING P-I-N SEMICONDUCTORS

Filed March 6, 1963 2 Sheets-Sheet 1

INVENTOR.
James L. Blankenship
BY
Roland A. Anderson
ATTORNEY.

Oct. 19, 1965 J. L. BLANKENSHIP 3,212,940

METHOD FOR PRODUCING P-I-N SEMICONDUCTORS

Filed March 6, 1963 2 Sheets-Sheet 2

INVENTOR.
James L. Blankenship

BY

Roland A. Anderson

ATTORNEY.

United States Patent Office 3,212,940
Patented Oct. 19, 1965

3,212,940
METHOD FOR PRODUCING P-I-N SEMICONDUCTORS

James L. Blankenship, Knoxville, Tenn., assignor to the United States of America as represented by the United States Atomic Energy Commission Filed Mar. 6, 1963, Ser. No. 263,362
6 Claims. (Cl. 148—1.5)

Figure 2:
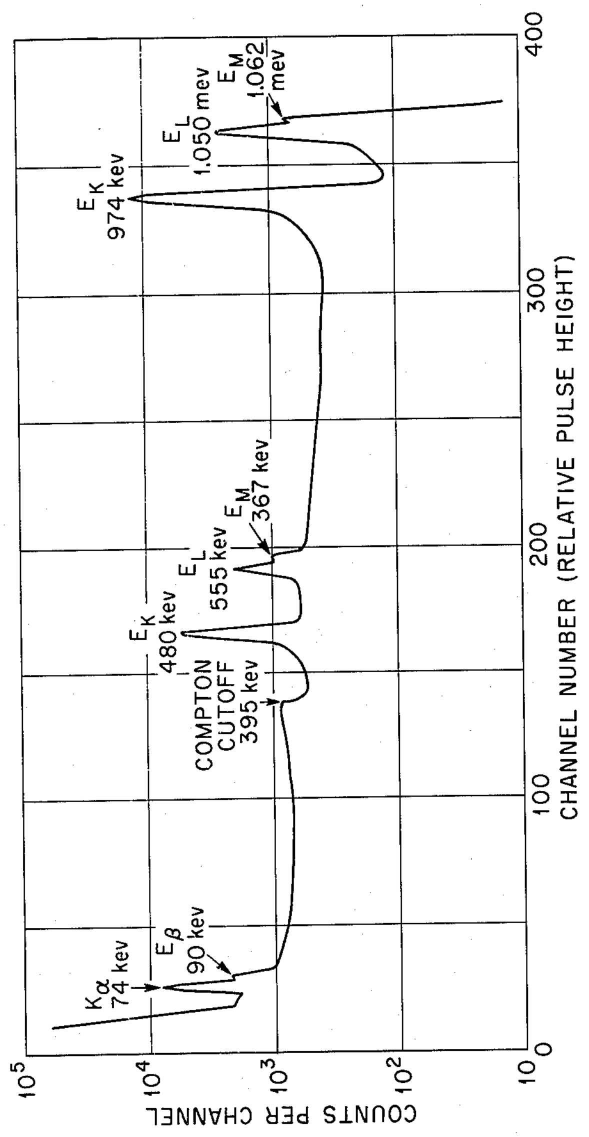

This invention relates to semiconductors and more particularly to an improved P-I-N semiconductor and the method of producing it.

Interest has risen in the use of semiconductors for the detection of nuclear particles. These detectors have the advantage of good energy resolution and linearity coupled with fast rise time and compact size.

The principle of operation of the semiconductor is analogous to the gaseous ion chamber. An electric field is established across a medium of low conductivity. When a charged nuclear particle penetrates the medium, collisions occur, producing ion pairs in the case of the ion chamber, or electron-hole pairs in the solid lattice. The charges are separated by the field and collected at the boundaries, producing electrical pulses that can be amplified and recorded.

The detectors used in this field are usually P-N phosphorous diffused junction diodes and P-N surface barrier diodes made by evaporating a metal onto the surface, such as produced by gold plating a silicon wafer. P-N detectors of these types have a limited energy linearity of pulse height response as a result of a very thin depletion region even though silicon of high resistivity and high voltages are used. The P-N junction is fabricated from extrinsic material, that is, either P-type or N-type material. In this detector, the working depth is limited by the resistivity of the bulk material and the applied reverse bias. Another more attractive semiconductor detector is the P-I-N junction having a thin P region on one side of the material and a thin N region on the other side. It is fabricated from intrinsic material such as silicon compensated to have equal numbers of donors and acceptors. In this device the entire body is useful as a detector independent of the reverse bias voltage. The field gradient is constant throughout such a device and the breakdown voltage at the surface and in the bulk is greater than a comparable P-N junction device.

Heretofore, it has been the practice to compensate the bulk material of the P-I-N device to intrinsic by drifting Li into the silicon lattice. See Pell 3,016,313. One method employed the steps of: preparation of a silicon wafer; application of Li (as molten metal, suspension in oil, etc,) to one face of the wafer; alloying the Li with the Si and diffusing the lithium into the silicon; and heating, with reverse bias applied, to drift the lithium ions into the lattice thus producing the intrinsic layer. A lower resistivity (and thus lower cost) silicon can be utilized for these P-I-N detectors.

This method, and the products obtained thereby, have certain disadvantages. For example, it is essential that ohmic contact be made to both the front surface of the finished detector (the N+ surface) and the P+ back surface. In order to approach ohmic contact conditions, a relatively large quantity of Li was required so that after diffusion and drift there would still remain low sheet resistance. Lithium cannot provide substantially greater than $10^{17}$ atoms/cm.$^3$ surface concentration and, as a result of the sheet resistance criteria, lithium had to be diffused into the wafer a distance of about 150 microns. The large concentrations of the lithium, and its high reaction rate with silicon, resulted in very non-uniform detector devices. Large surface pits were produced, and lithium precipitated in the areas of high concentration over relatively long periods of time resulting in variable response of the device. Quality control was therefore difficult to achieve, and even acceptable units had higher sheet resistance than desired and the response thereof changed with time or as a result of ambient conditions.

Applicant, with knowledge of these defects in prior art has for an object of his invention the provision of a method of making P-I-N junction devices of improved characteristics by reducing the lithium-silicon reaction and thus reducing the amount of lithium required, and by providing a protective layer to exclude air during the alloying process. A lower concentration of Li can be achieved in applicant's method by performing a phosphorous diffusion to provide the necessary donor impurity surface concentration to achieve an ohmic contact. Also, satisfactory lithium concentration for lithium drifting is achieved by diffusing into the crystal lattice a given number of atoms/cm.$^2$, the number being determined by the requirements of the bulk material. Protection of the lithium-silicon surface to reduce the Li-Si reaction is provided by a layer of aluminum or other metal such as gold, that is nonreactive with lithium and which does not alloy with the bulk material of the crystal, at the temperatures at which the lithium alloys. Further, this protective metal should be selected to coat easily over the Li surface.

Applicant has as another object of his invention a method of making a P-I-N junction having a thin dead layer.

Applicant has as a further object of his invention the provision of a method of making a P-I-N detector by diffusing an impurity into the bulk semiconductor material through a layer of a second impurity having like impurity conductive characteristics, to produce a diode that can be drifted and will have a thin dead layer.

Applicant has as a still further object of his invention the provision of an improved method of making P-I-N detectors wherein the ohmic contact to the lithium diffused layer is greatly improved by applying the lithium over the phosphorous coating since the phosphorous diffused layer yields a low sheet resistance with a thin diffusion depth.

Other objects and advantages of my invention will appear from the following specification and accompanying drawings and the novel features thereof will be particularly pointed out in the annexed claims.

Figure 1:
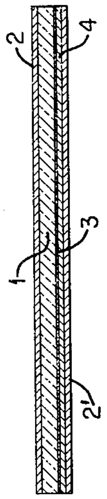
Figure 3:
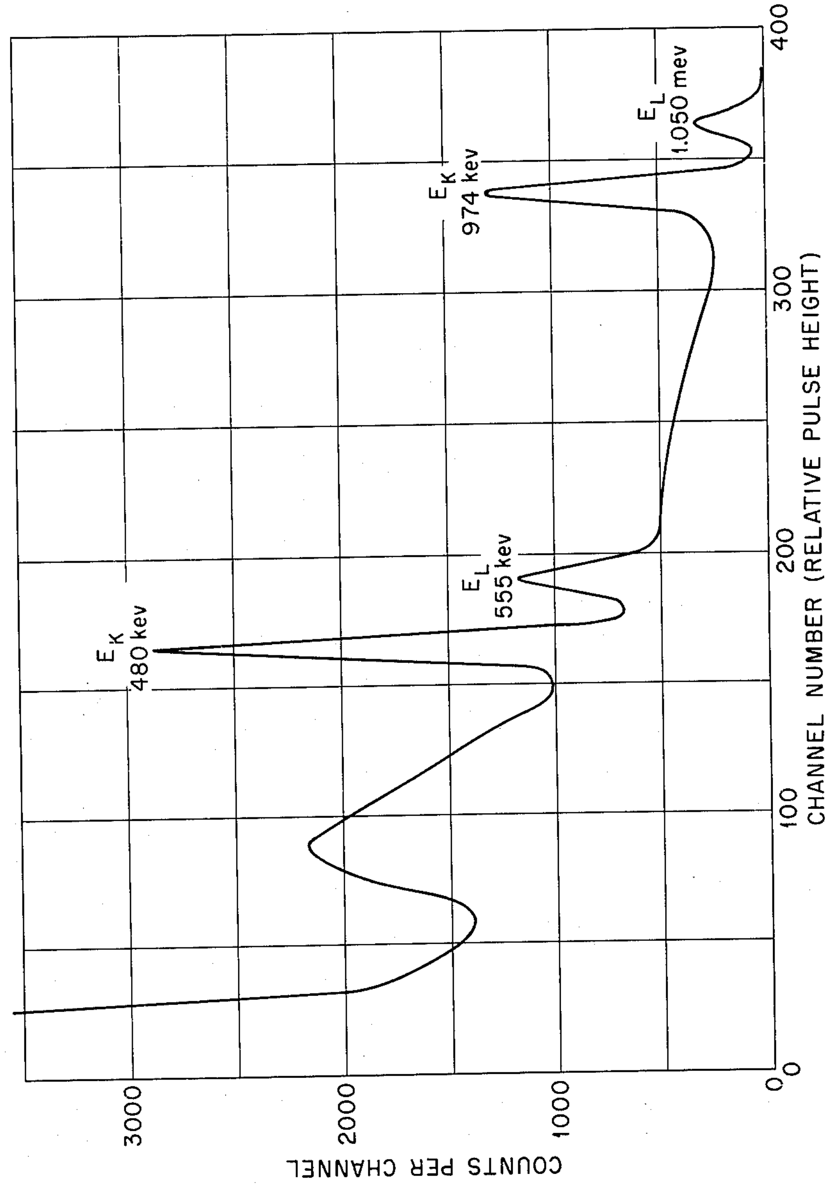

In the drawings, FIG. 1 is a cross sectional view of a partially completed P-I-N semiconductor. FIG. 2 is a graph of the $Bi^{207}$ spectrum plotted from data collected by my improved P-I-N semiconductor. FIG. 3 is a graph of the same substance plotted from data collected with a high quality P-N diode detector.

Referring to the drawings in detail and particularly to FIG. 1, a partially completed P-I-N detector made in accordance with my improved process as detailed hereinafter includes a wafer 1 of semiconductor material having an aluminum coat 2 on one face forming an ohmic P+ contact. The opposite face is covered by a doped layer of phosphorous 3. Over layer 3 of wafer 1 is a coating of Li 4 in its partially diffused state, and over the Li layer for protecting it from the atmosphere is an outer coating of aluminum 2'. The last aluminum layer is optional and serves as a protective coating during the diffusion of the Li into semiconductor material. In this arrangement it provides the N(−) ohmic contact or if omitted, the phosphorous doped surface through which the Li has been diffused, serves this purpose.

Certain terms as used in this application are generally defined as follows:

*Extrinsic* refers to the situation where the conductivity is determined by the concentration of either donor or acceptor impurities.

*Compensated intrinsic* refers to the situation where the concentration of electron donor impurities is equal to the concentration of electron acceptors.

*Diffusion* implies motion due to temperature and impurity gradient as where a heavy concentration of impurity is at an elevated temperature, resulting in an outward movement.

*Drift* implies a movement of a charge carrier (electron or ion) due to the influence of an electric field gradient.

*Dead layer* implies the layer from which no charge is collected, i.e., is inactive as a charge collecting medium. It generally represents part of the heavily doped or diffused portion, usually about half of such region.

*Degenerate material* refers to semiconductor material that has been heavily doped so as to act as a metal.

*Depletion region* is the region of a reverse biased (P-N) diode where an electric field gradient exists but where impurity atoms are ionized or depleted of charge carrier. Almost all of the voltage drop due to the reverse bias occurs across this region.

Applicant's improved method of producing P-I-N semiconductor detectors may be generally described as:

(a) Heating a wafer of P-type semiconductor material such as elemental silicon, carbon or germanium or intermetallic materials such as silicon carbide, gallium antimonide or lead telluride, in an atmosphere containing an N-type impurity such as phosphorous, antimony, or arsenic for a time and temperature to produce an N-doped layer thereon, (b) removing the N-doped layer from one side of said wafer, (c) depositing aluminum, boron, gallium or other metal which will provide a suitable ohmic contact P+ doped layer on the stripped or dope-free surface, (d) heating the wafer for a time and temperature to alloy said aluminum or other metal with the semiconductor material to produce a P+ surface, (e) depositing first an N-type material with a high mobility, such as lithium and then a protective metallic coating such as aluminum or gold on the remaining N-doped face of the wafer to produce an N+ surface, (f) heating for a time and temperature sufficient to alloy said lithium layer with the semiconductor material and to diffuse said lithium into the semiconductor material, and (g) maintaining the wafer at a substantially constant temperature, with an electric field applied in a reverse direction, for a time sufficient to drift lithium ions across the wafer to produce a wide intrinsic region between said N+ and P+ surfaces. In carrying out this process, it is important that the higher temperature step of depositing phosphorous on the semiconductor material precede the lower temperature step of applying the aluminum coating. If the higher temperature of 1000° C. were applied to aluminum it could cause diffusion of the aluminum into the semiconductor material which would be undesirable. Finally, it should be pointed out that in the final clean up of the semiconductor, any phosphorous dope, lithium, or aluminum which may have accumulated along the edges of the wafer are removed by conventional techniques such as CP–4 chemical polish, so that the wafer appears as shown in FIG. 1.

Applicant's improved process is more clearly set forth in the following specific examples:

*Example I*

A 2 mm. thick wafer of P-type silicon (20–200 ohm/cm.) was prepared by slicing, lapping and polishing in the usual way. The wafer was then placed in a furnace and heated to about 1025° C. for about 2 hours in a $P_2O_5$ atmosphere with nitrogen as a carrier gas to form an N-doped layer. While nitrogen was used as a carrier, it is apparent that any other suitable carrier such as oxygen or argon which would serve to exclude impurities such as boron, an opposite type impurity, could be employed. The $P_2O_5$ concentration for this step is not critical. Once a glass layer, which is a combination of phosphorous and silicates, is formed on the surface in the first few minutes of the treatment, there is a reservoir of phosphorous that is sufficient for the entire diffusion. Phosphorous diffusion yields a degenerate surface layer which is conductive and has the properties of a metal rather than those of a semiconductor.

The N-doped layer is now removed from one side or face of the wafer by etching or chemical or mechanical polishing. If etched, a mixture of HF and $HNO_3$, called CP–4 chemical polish, is commonly used. The parts of the surface to be protected are covered by etch resisting wax, and the wafer or slice is submerged in the etching mixtures for one to five minutes. Alternatively, the face of the sample could be mechanically polished by well known techniques.

Aluminum is deposited on the face by vacuum metal evaporation, and the wafer is then heated in a furnace at about 660° C. for 10 minutes to alloy the aluminum and the silicon to produce a P+ contact surface, which serves as the ohmic back contact.

The wafer is next placed in a vacuum evaporator and first lithium and then aluminum is deposited on the surface or face opposite the ohmic back contact. The reason for depositing the aluminum coating over the lithium coating is to protect it against the atmosphere until diffused into the crystal, after which the aluminum coating can be removed, if desired. This may be accomplished in various ways employing conventional techniques.

One preferred method of depositing lithium is to take a sheet of molybdenum refractory metal, and to form it into the shape of a boat. This shape was selected since a container is needed to contain the molten lithium, as it tends to spread in all directions when melted. Current is passed through the boat after a small charge of lithium is placed therein. The resulting heat vaporizes the lithium which covers the wafer in the vacuum chamber, coating it uniformly to a measured and controlled thickness resembling the deposition from a spray gun. The amount of lithium deposited and subsequently diffused into the silicon is determined by the requirements of the bulk material to render it intrinsic.

One preferred method of depositing the aluminum is to select an aluminum wire, wrap it around a length of refractory metal, such as tungsten wire, which serves as a heater. Then a current is passed through the heater wire to melt the aluminum, then as the temperature is raised further the aluminum will boil off and the vapor will spread in all directions and cover the exposed surface of the wafer uniformly. Suitable layers deposited in this manner are about 100 A. for lithium and 1000 A. for aluminum, but these are not critical.

The next step involves a special technique employed for passing the lithium through the phosphorous coat without destroying the phosphorous layer. It contemplates using the aforementioned measured and controlled thickness of lithium and the application of heat at a desired temperature for a time sufficient to diffuse all of the lithium through the layer into the silicon. To carry out this step the wafer, depending upon size, is heated at about 350° C. for 10 minutes to alloy the lithium and silicon and diffuse the lithium into the silicon lattice. In the alternative, a wafer of different size may be heated to 450° C. for 15 minutes. However, this step is not limited to either condition. Instead it depends upon wafer size. The temperature measured is furnace temperature. What is necessary is to heat the wafer to about 400° C. for a few minutes. Larger wafers take longer, small wafers take less time. This temperature creates no problem with aluminum since aluminum and silicon together will not melt below about 577° C.

Finally, the lithium is drifted into the silicon by holding the temperature constant while applying a reverse bias voltage across the wafer. While not critical, the preferred range of temperatures for silicon is 75° C. to 175° C., or if germanium is used instead of silicon, the preferred range is from room temperature to about 125° C. The reverse bias is applied by electrical contact with the P and N layers of the wafer by clamp or otherwise. The lithium ions are moved into the silicon lattice by the electric field. Heating may be accomplished with a thermostatically controlled heat source such as a stirred silicone oil bath in which the wafter is immersed. The thermal coupling achieved in the prior art did not limit the temperature rise in the wafer as a result of current increase due to depletion layer growth as the drift progresses. Control was thus difficult as the temperature dependence of current is exponential—the current increases by a factor of 2 for each 12° C. increase. As a result, the temperature setting must be periodically reset to generally optimize the drift process. However, if a temperature "run-away" occurs, the detector is spoiled. In order to prevent this, a very slow drift program has been used—of the order of 10 days at a power dissipation of about 5 watts.

Because of the critical relationship of temperature and current, the applicant found that the current is a better indication of the wafer temperature than was the temperature measurement at the heat sink (as was used in the prior art). Thus, applicant has employed apparatus for accomplishing the drifting step wherein the heater has a low total heat capacity for rapid response, and its operation is regulated to provide a given temperature measured at the wafer. With a servo system, the temperature of the heat sink is forced to control the current. A constant voltage is then applied across the wafer. With this arrangement an optimum drift program can be established at maximum power dissipation permitting the increase of the depletion depth at $T^{1/2}$ time dependence. Up to 75 watts may be dissipated and drift can be achieved automatically in about 2½ days.

*Example II*

The reason for applying an aluminum coating over the lithium, as outlined in Example I, is to protect it from exposure to the atmosphere until all of the lithium has been diffused into the crystal. The oxygen and water vapor normally present in air react rapidly with pure lithium metal to form oxides and hydroxides. The aluminum metal coating over the lithium retards this reaction of lithium with oxygen and water by virtue of the low diffusion rate of these gases through the aluminum coating.

As an alternative to the process of Example I, particularly where a small wafer is in preparation, the step of coating over the lithium with aluminum is omitted. Instead, a measured and controlled thickness of lithium metal is deposited on the wafer in a vacuum chamber and all of the lithium is diffused into the lithium lattice, by application of heat as described in Example I, so that no lithium remains on the surface. Under these conditions the need for a protective coating of aluminum is obviated, since lithium is no longer exposed to the atmosphere. Furthermore, omission of the aluminum coating does not introduce a problem of making ohmic contact to the lithium diffused surface since ohmic contact to the lithium diffused layer is greatly improved by the phosphorous doped layer which yields a low sheet resistance without requiring more than 1 or 2 microns of diffusion depth, and the concentration of phosphorous electrically active as a donor (n-type) is $\sim 10^{21}$ atoms/cm.$^3$ at the surface.

The P-I-N junction devices prepared using applicant's improved process as set forth above, have been utilized as detectors in the analysis of the spectra of various radioactive substances. Typical of the results obtained therewith is the $Bi^{207}$ spectra shown in FIG. 2. This can be compared with the spectra obtained using a high quality P-N diode detector shown in FIG. 3.

It can be seen by one versed in the art that the spectra as obtained using the P-I-N device is considerably more accurate than that determined using the P-N device. For example, the pulse height is generally proportional to the energy of the particular charged particle. Furthermore, there is essentially no erroneous data from spurious peaks arising from a non-uniform dead layer, in the low energy range, or in the energy region between the 974 kev. conversion electron and the 555 kev. gamma ray. Even the 73 and 86 kev. X-ray peaks are resolved. Also, it can be noted that this improved spectra is obtained at 50 volts bias rather than the 500 volts bias utilized for the P-N device.

These results are superior to the results obtained in the prior art utilizing scintillation detectors, and competitive to a $\beta$-ray magnetic spectrograph. Thus, applicant's device provides a compact and accurate detector for most, if not all, charged particles including $\alpha$ and $\beta$ particles, protons, tritons, deutrons, $\gamma$ rays, and (with appropriate radiators) neutrons.

Having thus described my invention, I claim:

1. A method of making a rectifying semiconductor comprising the steps of heating a wafer of silicon in an atmosphere of phosphorous to deposit a thin coat of phosphorous dope thereon, stripping the dope from one face of the wafer and applying an aluminum coating thereon, bonding the aluminum to the silicon, depositing a predetermined quantity of lithium under vacuum on the phosphorous doped layer on the opposite face of the wafer, applying sufficient heat to alloy with the phosphorous layer and diffuse the lithium through the doped layer and into the silicon, and maintaining the temperature of the wafer constant while applying a reverse bias to the wafer for a period of several days to drift the lithium ions across the wafer to a predetermined depth and concentration to form an intrinsic layer between the p and n layers.

2. A method of making a rectifying semiconductor comprising the steps of heating a wafer of silicon in an atmosphere of phosphorous to deposit a thin coat of phosphorous dopant thereon, stripping the dopant from one face of the wafer and applying an aluminum coating thereon, depositing lithium and then aluminum on the phosphorous doped layer on the opposite face of the wafer, applying sufficient heat to alloy with the phosphorous layer and diffuse the lithium through the doped layer into the silicon, and maintaining the temperature of the wafer constant while applying a reverse bias at constant voltage to the wafer for a period of two and one-half days to drift the lithium ions across the wafer to form an intrinsic layer between the p and n layers.

3. A method of making a rectifying semiconductor comprising the steps of heating a wafer of silicon in an atmosphere of phosphorous to deposit a thin coat of phosphorous dopant thereon, etching away the doped layer from one face of the wafer and applying a metal coating of low conductivity thereto, depositing a selected concentration of lithium under vacuum on the phosphorous doped layer on the opposite face of the wafer, applying sufficient heat to alloy with the phosphorous layer and diffuse the lithium through the dopant into the silicon, and maintaining the temperature of the wafer constant while applying a reverse bias to the wafer for a period of several days to drift the lithium ions across the wafer to form an intrinsic layer between the p and n layers.

4. A method of making a rectifying semiconductor comprising the steps of heating a wafer of silicon in an atmosphere of phosphorous to deposit a thin coat of phosphorous dopant thereon, stripping the doped layer from one face of the wafer and applying an aluminum coating thereon, bonding the aluminum to the silicon, vaporizing a measured quantity of lithium under vacuum and depositing it on the phosphorous doped layer on the opposite face of the wafer, applying only enough heat to alloy with the phosphorous layer and diffuse the lithium through the doped layer and into the silicon, and maintaining the temperature of the wafer constant while applying a reverse bias to the wafer for a period of several days to drift the lithium ions across the wafer to form an intrinsic layer between the p and n layers.

5. A method of making a rectifying semiconductor comprising the steps of heating a wafer of silicon in an atmosphere of phosphorous to deposit a thin coat of phosphorous dopant thereon, stripping the doped layer from one face of the wafer and applying aluminum coating thereon, bonding the aluminum to the silicon, depositing a measured quantity of lithium and then aluminum on the phosphorous doped layer on the opposite face of the wafer, raising the temperature of the wafer to a point where the lithium will alloy with the phosphorous layer and diffuse through the dope and into the crystal lattice of the silicon, and maintaining the temperature of the wafer constant while applying a reverse bias to the wafer for a period of several days to drift the lithium ions across the wafer to form an intrinsic layer between the p and n layers.

6. A method of making a rectifying semiconductor comprising the steps of heating a wafer of silicon in an atmosphere of phosphorous to deposit a thin coat of phosphorous dopant thereon, stripping the doped layer from one face of the wafer and applying an aluminum coating thereon, bonding the aluminum to the silicon, depositing a measured quantity of lithium under vacuum on the phosphorous doped layer on the opposite face of the wafer, raising the temperature of the wafer to a point where all of the lithium will alloy with the phosphorous layer and diffuse through the doped layer and into the crystal lattice of the silicon, and maintaining the temperature of the wafer constant while applying a reverse bias to the wafer for a period of several days to drift the lithium ions across the wafer to form an intrinsic layer between the p and n layers.

References Cited by the Examiner

UNITED STATES PATENTS

| | | | |
|---|---|---|---|
| 2,725,315 | 11/55 | Fuller | 148—19 |
| 2,792,540 | 5/57 | Pfann | 148—189 |
| 2,792,990 | 5/57 | Pfann | 148—189 |
| 2,819,990 | 1/58 | Fuller | 148—1.5 |
| 2,979,429 | 4/61 | Cornelison | 148—189 |
| 3,016,313 | 9/62 | Pell | 148—1.5 |
| 3,078,196 | 2/63 | Ross | 148—189 |
| 3,082,127 | 3/63 | Lee | 148—190 |
| 3,128,545 | 4/64 | Cooper | 148—1.5 |

OTHER REFERENCES

"Conductivity in Semiconductors," by K. Lark Horovitz, Electrical Eng., December 1949, pages 1047–1056, copy library.

"Reactions of Lithium as a Donor and Acceptor in ZnO," Journal Physics and Chemistry of Solids, volume 15, pages 324–334, October 1960, copy library.

"Diffusion Rate, of Lithium in Silicon Between 25° C. and 125° C.," June 18, 1959, Bulletin American Physical Society, pages 320, Ser. II, volume 4, copy library.

"Introduction to Semi Conductors," by Dunlap, published 1957, John Wiley and Sons Inc., New York, pages 238 and 239.

"Semi Conductors," by N. B. Hannay, published 1959, Reinhold Publishing Co., New York, pages 235–238.

DAVID L. RECK, *Primary Examiner.*

HYLAND BIZOT, *Examiner.*